(12) United States Patent
Wandel

(10) Patent No.: US 8,649,331 B2
(45) Date of Patent: *Feb. 11, 2014

(54) DATA BURST COMMUNICATION TECHNIQUES FOR MOBILE COMMUNICATION DEVICES OPERATING IN PACKET DATA SESSIONS

(75) Inventor: Matthias Wandel, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/611,484

(22) Filed: Sep. 12, 2012

(65) Prior Publication Data

US 2013/0003702 A1    Jan. 3, 2013

Related U.S. Application Data

(63) Continuation of application No. 12/789,110, filed on May 27, 2010, now Pat. No. 8,340,025, which is a continuation of application No. 11/414,568, filed on Apr. 28, 2006, now Pat. No. 7,738,416.

(51) Int. Cl.
    *H04Q 7/00*            (2006.01)

(52) U.S. Cl.
    USPC ........... 370/328; 370/331; 370/315; 370/329; 370/352; 370/254; 370/241

(58) Field of Classification Search
    CPC ............................. H04B 7/2643; H04W 36/30
    USPC ......... 370/332, 337, 331, 329, 315, 252, 254, 370/216, 280, 328; 455/501, 446, 422.1, 455/436, 450, 454, 509, 130, 91, 525, 403
    See application file for complete search history.

(56) References Cited

U.S. PATENT DOCUMENTS

| | | | |
|---|---|---|---|
| 4,888,767 A | 12/1989 | Furuya et al. | |
| 6,161,016 A | 12/2000 | Yarwood | |
| 6,418,169 B1 | 7/2002 | Datari | |
| 6,657,980 B2 | 12/2003 | Holtzman et al. | |
| 7,003,323 B2 | 2/2006 | Fischer et al. | |
| 7,139,254 B2 | 11/2006 | Kivijarvi et al. | |
| 7,551,639 B2 | 6/2009 | You et al. | |

(Continued)

FOREIGN PATENT DOCUMENTS

| | | |
|---|---|---|
| EP | 1928197 A2 | 6/2008 |
| WO | 0193505 A2 | 12/2001 |

(Continued)

*Primary Examiner* — Joseph Arevalo
(74) *Attorney, Agent, or Firm* — Gowling Lafleur Henderson LLP

(57) ABSTRACT

A mobile device experiences a condition where a time overlap exists between a packet data burst being communicated over a packet data channel of a serving cell and broadcast data burst being communicated over a broadcast control channel of a neighbor cell. The mobile device sets its RF receiver to receive the packet data burst instead of the broadcast data burst based on identifying that the neighbor cell is not a candidate for an upcoming handoff. On the other hand, the mobile device sets its RF receiver to receive the broadcast data burst instead of the packet data burst based on identifying that the neighbor cell is a candidate for an upcoming handoff. The mobile device may set the RF receiver to receive the packet data burst instead of the broadcast data burst based on further identifying that a call drop is imminent.

12 Claims, 5 Drawing Sheets

(56) References Cited

U.S. PATENT DOCUMENTS

| | | |
|---|---|---|
| 2001/0015964 A1* | 8/2001 | Fuchisawa ................... 370/332 |
| 2002/0034968 A1 | 3/2002 | Fischer et al. |
| 2003/0053427 A1 | 3/2003 | Kanda et al. |
| 2003/0207684 A1 | 11/2003 | Wesel |
| 2003/0210674 A1 | 11/2003 | Honkasalo et al. |
| 2004/0081248 A1 | 4/2004 | Parolari |
| 2004/0120302 A1 | 6/2004 | Sebire et al. |
| 2004/0157554 A1 | 8/2004 | Wesel |
| 2005/0007986 A1 | 1/2005 | Malladi et al. |
| 2005/0009523 A1 | 1/2005 | Pekonen |
| 2006/0028995 A1 | 2/2006 | Canoy et al. |
| 2006/0153147 A1* | 7/2006 | Chillariga et al. ............ 370/337 |
| 2007/0025295 A1* | 2/2007 | Kono ............................ 370/331 |
| 2008/0247367 A1 | 10/2008 | Guo et al. |
| 2009/0213810 A1* | 8/2009 | Shousterman et al. ....... 370/331 |
| 2010/0029325 A1 | 2/2010 | Wang et al. |
| 2013/0003702 A1* | 1/2013 | Wandel ......................... 370/331 |

FOREIGN PATENT DOCUMENTS

| | | |
|---|---|---|
| WO | 2006090254 A1 | 8/2006 |
| WO | 2008070777 A2 | 6/2008 |
| WO | 2008117185 A2 | 10/2008 |

* cited by examiner

DATA BURST COMMUNICATION TECHNIQUES FOR MOBILE COMMUNICATION DEVICES OPERATING IN PACKET DATA SESSIONS

CROSS-REFERENCE TO RELATED APPLICATIONS

This application is a continuation of and claims priority to U.S. non-provisional patent application having application Ser. No. 12/789,110 and filing date of 27 May 2010, now U.S. Pat. No. 8,340,025, which is a continuation of and claims priority to U.S. non-provisional patent application having application Ser. No. 11/414,568 and filing date of 28 Apr. 2006, now U.S. Pat. No. 7,738,416, which is hereby incorporated by referenced herein.

BACKGROUND

1. Field of the Technology

The present disclosure relates generally to data burst communications for mobile communication devices which operate in packet data communication sessions in wireless communication networks (e.g. GSM/GPRS networks).

2. Description of the Related Art

A mobile communication device may operate in a wireless communication network, such as a Global System for Mobile Communications (GSM) network which provides for high-speed data communications with use of General Packet Radio Service (GPRS). During a packet data communication session, the mobile device operates to receive data packets over a packet data traffic channel (PDTCH) of the wireless network. If the mobile device detects that a neighbor cell has a stronger radio signal strength indication (RSSI) than its current serving cell, it may need to be handed-off to the neighbor cell. So that it may receive information over a broadcast control channel (BCCH) or packet BCCH (PBCCH) of the handoff candidate neighbor cell, the mobile device operates to suspend packet data transfer operations over the PDTCH without notifying the wireless network. A selective retransmit scheme of the packet data session is subsequently utilized to receive data blocks missed during the suspension.

Although all appropriate information is eventually received using this technique, it may be very disruptive and wasteful with respect to data throughput, as data may be transmitted by the wireless network that is never received by the mobile device. Under some circumstances, it may even cause the wireless network to cancel the packet data session due to the lack of response from the mobile device.

Accordingly, what are needed are improved communication techniques during packet data sessions which overcome the deficiencies of the prior art.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Data burst communication techniques for mobile communication devices operating in packet data sessions are described herein. A mobile communication device is adapted to receive and decode packet data of a plurality of packet data bursts of a data block over a packet data channel during a packet data session. The mobile communication device is further adapted to receive and decode broadcast control data of a plurality of broadcast data bursts of the same or adjacent data block over a broadcast control channel contemporaneously with the receiving and decoding of the packet data, where each broadcast data burst is interleaved with packet data bursts of the packet data session. When a time conflict between at least one of the packet data bursts and at least one of the broadcast data bursts exists, the mobile communication device is adapted to prioritize the receiving and decoding of the at least one packet data burst over the at least one broadcast data burst. However, if the at least one broadcast data burst is from a "high priority" or "imminent" handoff candidate neighbor cell, the mobile communication device is adapted to prioritize the receiving and decoding of the at least one broadcast data burst over the at least one packet data burst without completely suspending packet transfer operations. Advantageously, an efficient and less disruptive communication technique is provided during packet data sessions.

Rather than completely suspend packet data transfer operations to aquire a neighbor cell when it is identified that its system information needs to be urgently received (e.g. a potential imminent handoff), the mobile device of the present disclosure operates to prioritize the receipt of data bursts on the broadcast control channel of the neighbor cell over data bursts of the packet data transfer channel of the current serving cell. Otherwise, the mobile device operates to prioritize the receipt of data bursts of the packet data transfer channel over data bursts of the broadcast control channel. Although some data bursts on the packet data transfer channel may be preempted for data bursts on the broadcast control channel at the time of the potential imminent handoff, those data bursts of the packet data transfer channel that do not conflict with the reception of data bursts on the broadcast control channel will continue to be received and transmitted. Thus, while the mobile device examines a high priority neighbor cell, packet data transfer operations may continue with minimal data loss only where conflict cannot be avoided.

Figure 1:
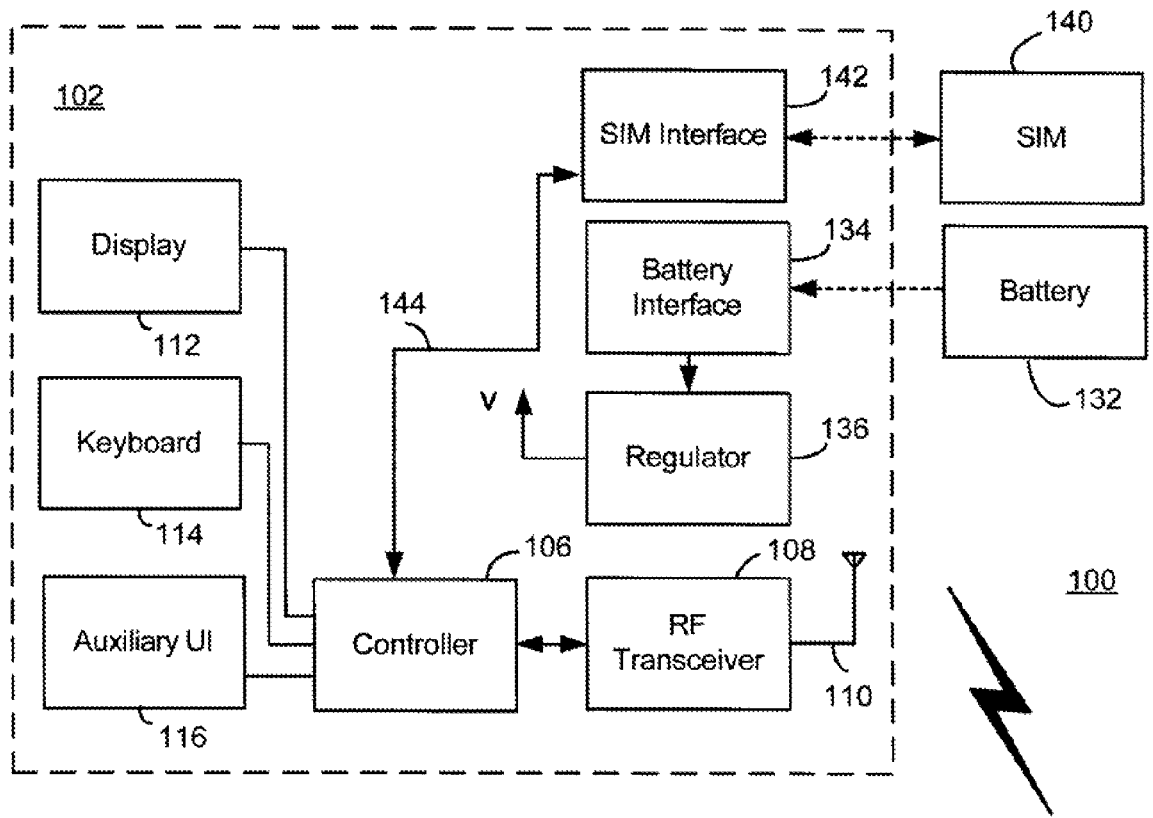
FIG. 1 is a block diagram which illustrates pertinent components of a mobile station and a wireless communication network.
Figure 1:
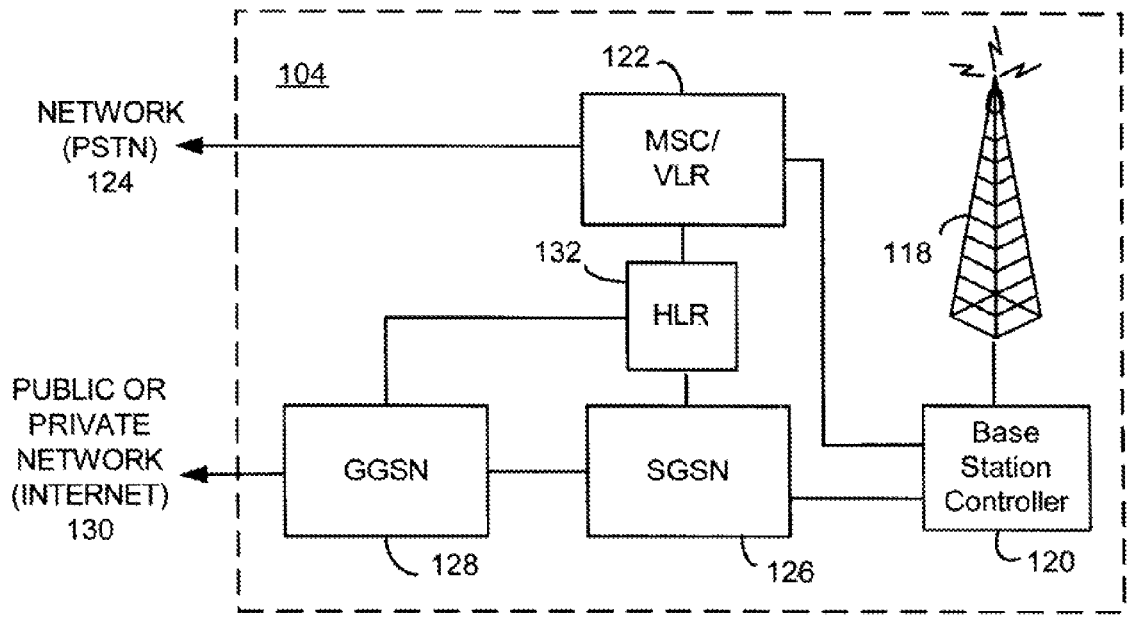

To illustrate general principles, FIG. 1 shows a block diagram of a communication system 100 which includes a mobile station 102 (one example of a wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port is on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged, Although the network consists of many parts, these parts all work together to result in certain behaviours at the wireless link.

Figure 2:
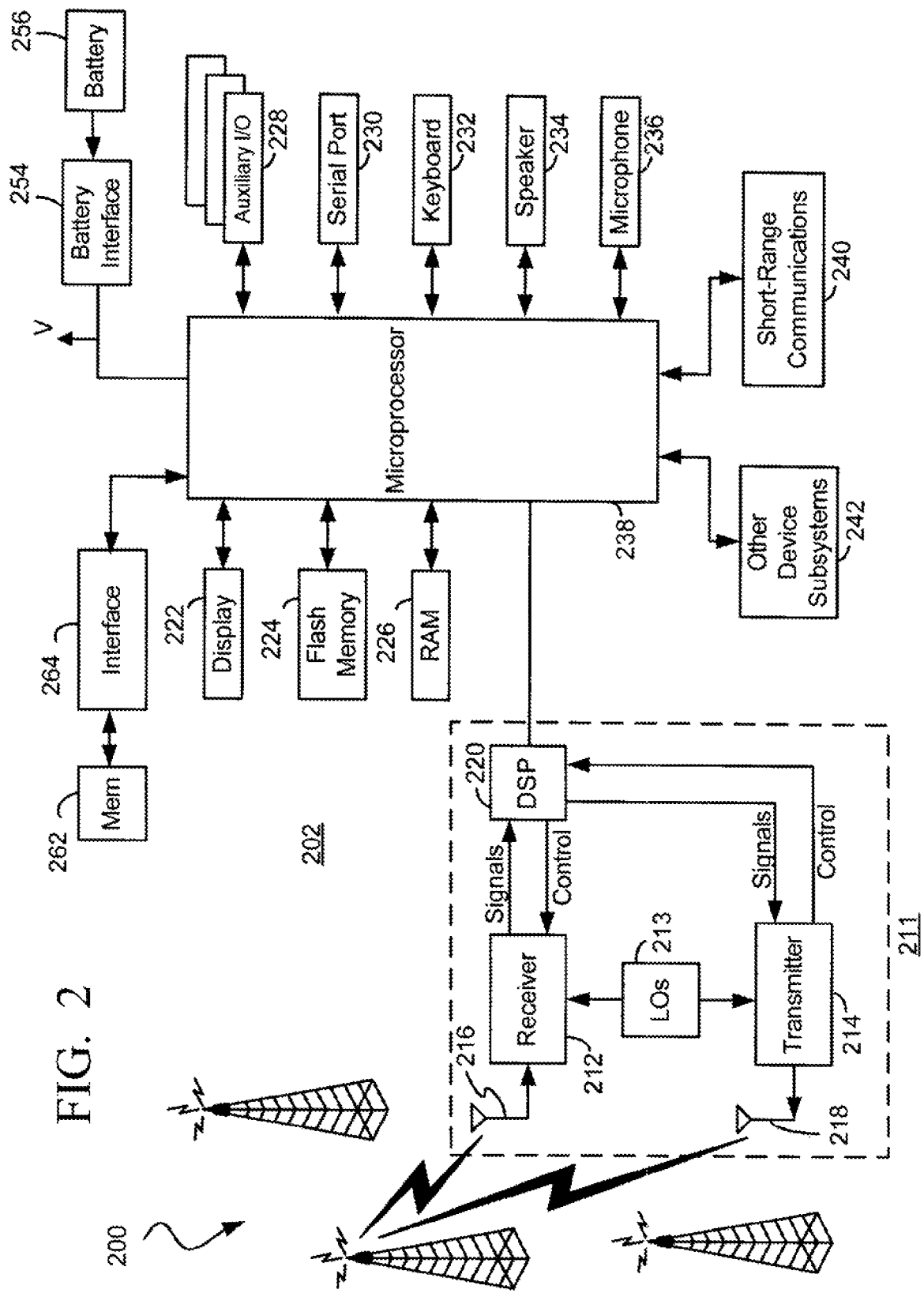
FIG. 2 is a more detailed diagram of a preferred mobile station of FIG. 1.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. The receiving and decoding technique of the present disclosure is generally controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information. The PIM application preferably has the ability to send and receive data items via the wireless network. In the present disclosure, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component which provides for communication between mobile station 202 and different systems or devices, which need not necessarily be similar devices.

Figure 3:
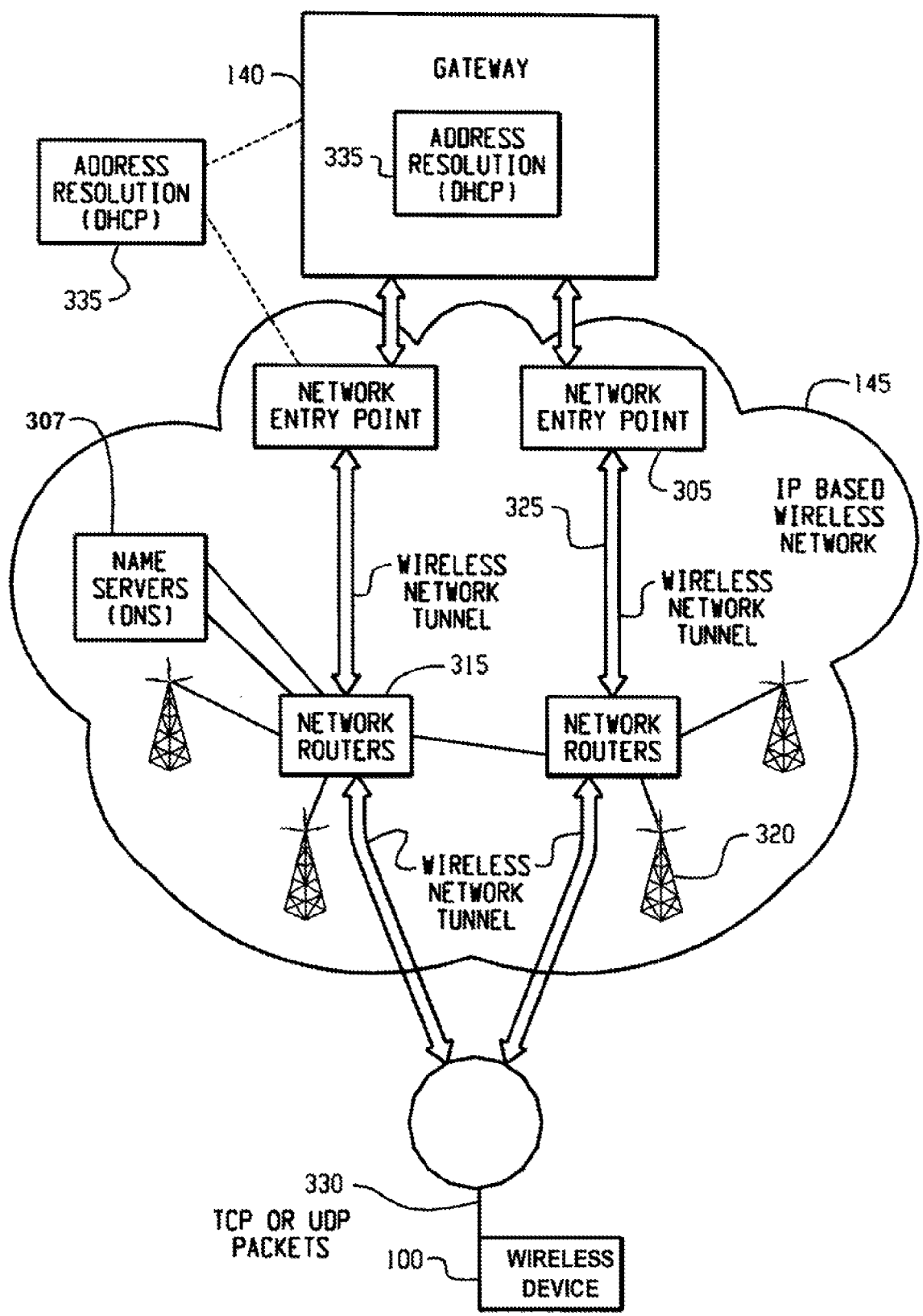
FIG. 3 is a particular system diagram for the mobile station and wireless network of FIGS. 1 and 2.

FIG. 3 shows a particular system structure for communicating with a mobile station. In particular, FIG. 3 shows basic components of an IP-based wireless data network which may be utilized. A mobile station 100 communicates with a wireless packet data network 145, and may also be capable of communicating with a wireless voice network (not shown). As shown in FIG. 3, a gateway 140 may be coupled to an internal or external address resolution component 335 and one or more network entry points 305. Data packets are transmitted from gateway 140, which is source of information to be transmitted to mobile station 100, through network 145 by setting up a wireless network tunnel 325 from gateway 140 to mobile station 100. In order to create this wireless tunnel 325, a unique network address is associated with mobile station 100. In an IP-based wireless network, however, network addresses are typically not permanently assigned to a particular mobile station 100 but instead are dynamically allocated on an as-needed basis. It is thus preferable for mobile station 100 to acquire a network address and for gateway 140 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile stations such as mobile station 100.

Wireless network tunnels such as a wireless tunnel 325 are opened across wireless network 345 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile station 100 must use a specific technique associated with wireless network 345. The step of opening such a wireless tunnel 325 may require mobile station 100 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 100 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 100. When an IP address has been allocated to mobile station 100 and communicated to gateway 140 information can then be forwarded from gateway 140 to mobile station 100.

According to the present disclosure, when it is identified that system information of a neighbor cell needs to be urgently received (e.g. a potential imminent handoff) during a packet data session, the mobile device operates to prioritize the receipt of data bursts on the broadcast control channel (BCCH) of the neighbor cell over data bursts of the packet data traffic channel (PDTCH) of the current serving cell. Otherwise, the mobile device operates to prioritize the receipt of data bursts of the PDTCH over data bursts of the BCCH. Although some data bursts on the PDTCH may be preempted for data bursts on the BCCH at the time of the potential imminent handoff, those data bursts of the PDTCH that do not conflict with the reception of data bursts on the PDTCH will continue to be received and transmitted. Thus, while the mobile device examines a high priority neighbor cell, packet data transfer operations may continue with minimal data loss only where conflict cannot be avoided.

Figure 4:
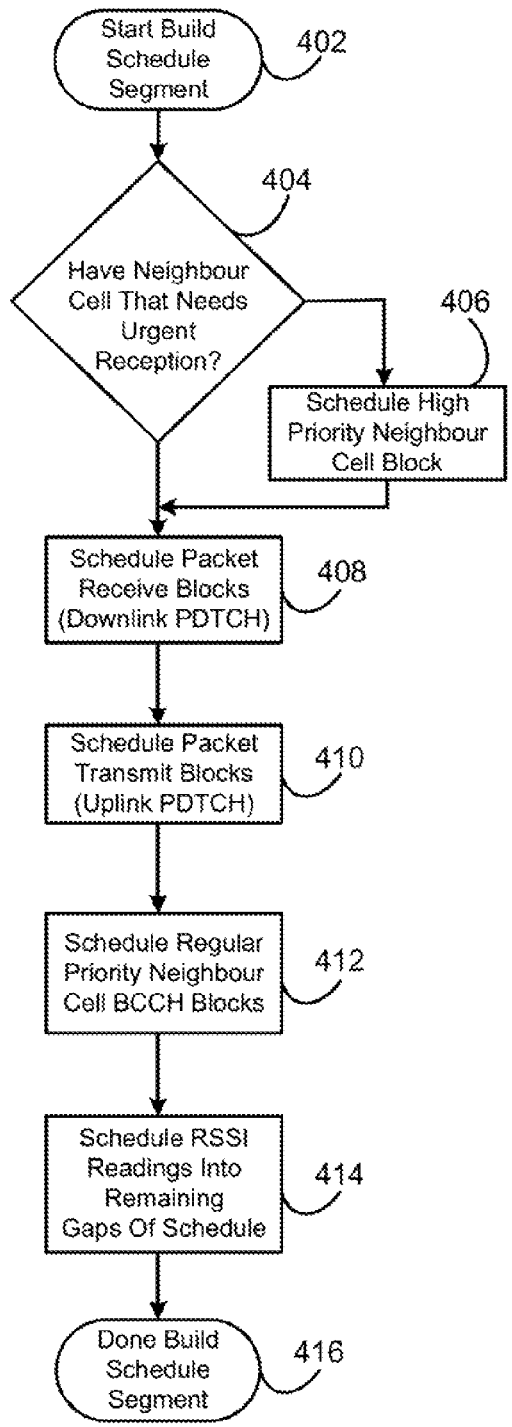
FIG. 4 is a flowchart relating to a method of prioritizing the scheduling of different types of data bursts for communication in the wireless communication network.
Figure 5:
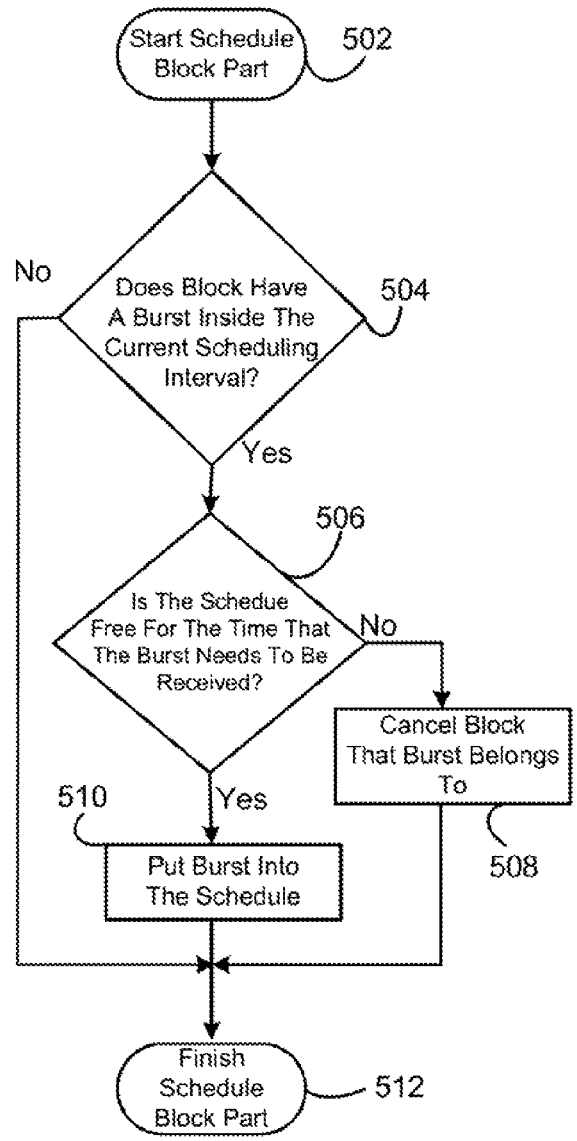
FIG. 5 is a flowchart relating to a method of scheduling the data bursts for communication in the wireless communication network (i.e. a scheduling subroutine function for the flowchart of FIG. 4)

FIGS. 4 and 5 are flowcharts which help describe the data burst communication techniques of the present disclosure. In particular, FIG. 4 is a flowchart relating to a method of prioritizing the scheduling of different types of data bursts for communications in the wireless communication network. FIG. 5 is a flowchart relating to a method of scheduling the data bursts for communication in the wireless communication network. The techniques described in relation to FIGS. 4 and 5 are performed by one or more processors of a mobile communication device (e.g. the mobile station described in relation to FIGS. 1-3). In particular, the techniques may be embodied in a computer program product which includes a computer readable medium (e.g. memory or computer disk) and computer instructions stored in the computer readable medium which are executable by the one or more processors for performing the techniques. Preferably, the techniques described herein are utilized within a GSM/GPRS network. Note that terminology and common practices associated with GSM/GPRS may be found in the numerous related communication standards documents.

Referring to FIG. 4, the mobile device is adapted to regularly or periodically produce a schedule of communication events for its receiver and transmitter in advance (e.g. a few milliseconds prior to actual reception/transmission). These scheduled events instruct or command the receiver and transmitter to receive and/or transmit data bursts on specific channels at particular time periods. Channels of the system that are used for reception and transmission are defined by unique frequency and time slot combinations. Also, the scheduling is driven at least in part by the timing dictated by the system. In the present embodiment (e.g. GSM/GPRS), data bursts repeat at an interval of 4.615 milliseconds (cosecs) ($^{120}/_{26}$). To facilitate minimized latency, the schedule is composed of one half of a frame (about 2.3 msecs) at a time. The scheduling algorithm is executed every 2.3 msec to build an additional 2.3 msecs of scheduling. The scheduling algorithm may be started slightly before or after such time, however, so that the scheduling interval always starts and ends at times that are not within a schedulable burst.

Each time the scheduling algorithm is executed, a list of data blocks are considered for scheduling the next upcoming time period. Each data block may include up to a predetermined number of data bursts to schedule according to a predetermined prioritization scheme. In the present embodiment, each data block includes from one (1) to four (4) data bursts for scheduling in such fashion. The predetermined prioritization scheme according to the present disclosure is as follows: "prioritized" broadcast receive blocks (i.e. prioritized BCCH) of neighbor cells are given the highest priority, followed by packet data receive blocks (i.e. downlink PDTCH), followed by packet data transmit blocks (i.e. uplink PDTCH), followed by "non-prioritized" broadcast receive blocks (i.e. non-prioritized BCCH) of neighbor cells. In the present embodiment, the listed order of priority is important to achieve efficient and less disruptive communications. Note that "prioritized" or "urgent" broadcast receive blocks are those broadcasted from a neighbor cell that is a likely handoff candidate for an imminent handoff. For example, it may be that the current serving cell has a relatively low receive signal strength indication (RSSI) and a "call drop" may be imminent, so that an imminent handoff to a neighbor cell may be required. In this case, an indication of "high priority" or "urgent status" is provided in association with the broadcast receive block for the scheduling algorithm.

Beginning at a start block 402 of FIG. 4 ("Start Build Schedule Segment"), the processor of the mobile device first identifies whether there is any urgent or high priority broadcast information (i.e. high priority BCCH) that needs to be received from a neighbor cell in the upcoming time period (step 404 of FIG. 4). If there is urgent or high priority broadcast information to be received at step 404, then the processor causes the receipt of such broadcast information from the neighbor cell to be scheduled (step 406 of FIG. 6). This scheduling is performed by calling the scheduling subroutine function of FIG. 5. In fact, each scheduling requirement needed in upcoming steps 408, 410, 412, and 414 is performed by a call to the scheduling subroutine function of FIG. 5.

If there is no urgent or high priority broadcast information to be received as identified at step 404, or the receipt of such broadcast information has already been scheduled at step 406, then processing continues at step 408 of FIG. 4. In step 408, the processor of the mobile device then schedules any packet data receive blocks (i.e. downlink PDTCH) to be received in the upcoming time period (step 408 of FIG. 4). Next, the processor of the mobile device schedules any packet data transmit blocks (i.e. uplink PDTCH) to be transmitted in the upcoming time period (step 410 of FIG. 4). Next, the processor of the mobile device schedules any regular priority broadcast information (i.e. regular priority BCCH) to be received in the upcoming time period (step 412 of FIG. 4). Finally, the processor of the mobile device schedules the reception of RF signals on other identified channels to perform RSSI readings (step 414 of FIG. 4). Again, in the present embodiment, the order of prioritization is important to achieve efficient and less disruptive communications than conventional techniques. The flowchart ends at an end block 416 of FIG. 4 ("Done Build Schedule Segment").

FIG. 5 is a flowchart relating to a method of scheduling the data bursts for communications in the wireless communication network. This may be referred to as the scheduling subroutine function which is called in any of steps 406, 408, 410, 412, and 414 of FIG. 4. In general, if the data block has a candidate data burst for scheduling within the current scheduling interval, it is first tested whether the data burst location is already occupied by an earlier-scheduled, higher-priority data burst. If the candidate data burst fits into the schedule location, the candidate data burst is scheduled; if the candidate data burst does not fit into the schedule location, the data block associated with the candidate data burst is canceled.

Beginning at a start block 502 of FIG. 5 ("Start Schedule Block Part"), the processor of the mobile device examines and identifies whether the data block has a candidate data burst to be scheduled within the current scheduling interval (step 504 of FIG. 5). If not, then the flowchart ends at an end block 512 of FIG. 5 ("Finish Schedule Block Part") to "return" to the appropriate step or location in the flowchart of FIG. 4. If there is a candidate data burst to be scheduled in the current scheduling interval at step 504, then the processor examines and identifies whether an earlier-scheduled, higher-priority data burst is already included within the current scheduling interval (step 506 of FIG. 5). If so, the data block that the candidate data burst is associated with is canceled (step 508 of FIG. 5) and the flowchart ends at end block 512 for returning to the main scheduling algorithm. If the schedule is free for the current scheduling interval at step 506, then the candidate data burst is included within the current scheduling interface (step 510 of FIG. 5). The flowchart ends at the end block 512 to return to the main scheduling algorithm of FIG. 4.

Figure 6A:
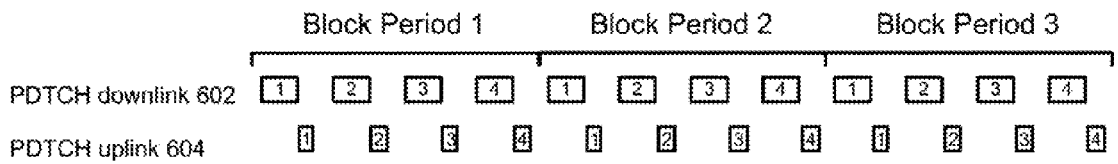
FIGS. 6A-6D are timing diagrams relating to the communication of packet data bursts over packet data channels and broadcast control data bursts over broadcast control channels.

FIGS. 6A-6D are timing diagrams relating to the communication of packet data bursts of a packet data channel and broadcast control data bursts of a broadcast control channel. These timing diagrams help illustrate the techniques of FIGS. 4-5 and results achieved therefrom. In FIG. 6A, a timing diagram is shown for a plurality of data bursts associated with a downlink packet data traffic channel (PDTCH) 602 and an uplink PDTCH 604 for a packet data communication session with a current serving cell. Time progresses from left to right in the figures. Each rectangular block (rectangular blocks 1, 2, 3, or 4) is indicative of a data burst (e.g. a single data burst for uplink PDTCH 604) or a group of consecutive data bursts (e.g. a group of four consecutive data bursts for downlink PDTCH 602). Each grouping of four data burst blocks is associated with a data block period (e.g. block periods 1, 2, 3, etc.) as indicated. During steady state communications of the packet data session, packet data bursts of the downlink and uplink PDTCH 602 and 604 are regularly and periodically communicated. Data bursts of uplink PDTCH 602 immediately follow data bursts of downlink PDTCH 604. In FIG. 6A, no data bursts associated with a broadcast control channel (BCCH) are shown for simplicity.

Figure 6B:
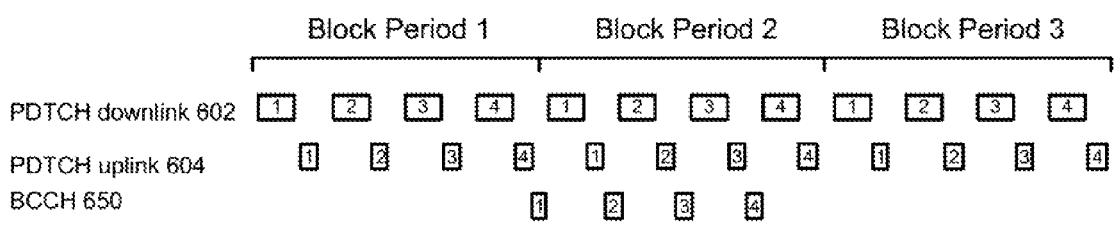

In FIG. 6B, data bursts associated with a BCCH 650 are included along with the data bursts of uplink and downlink PDTCH 602 and 604. Depending on the number of timeslots used for PDTCH, and the relative timing of neighbor cell BCCH blocks that must be received, the BCCH blocks may fit into the schedule without any conflict with PDTCH blocks as shown. In this case, data bursts of the BCCH are interleaved in an ideal fashion with the data bursts of the PDTCH. Thus, the mobile device may operate to receive and decode packet data from packet data bursts on the PDTCH while contemporaneously receiving and decoding broadcast data from broadcast data bursts on the BCCH (normal or prioritized) without conflict. As the BCCH block is received from a different neighbor cell having a different time base, however, the relative timing of the BCCH block may be anywhere relative to the PDTCH.

Figure 6C:
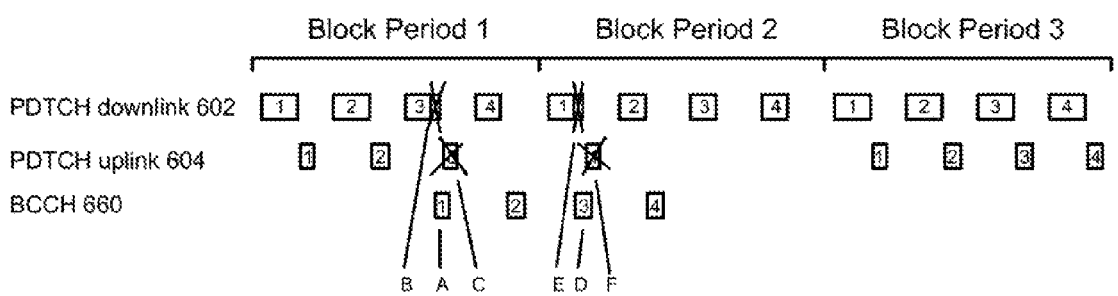

FIG. 6C depicts a case where BCCH bursts over a BCCH 660 of a high priority neighbor cell that need to be urgently received are in conflict with anticipated PDTCH bursts of the current serving cell. In block period 1, when a BCCH burst A conflicts with a downlink PDTCH burst B (which is a later portion of PDTCH data burst block 3) and an uplink PDTCH burst C, the BCCH burst. A is prioritized over the others and is received and decoded by the mobile device. As shown, the mobile device still also receives and decodes an initial portion of PDTCH data burst block 3 by reducing the number of slots that need to be received. For the uplink PDTCH burst C, the entire uplink item interferes and the remainder of the uplink block is canceled. Thus, no attempt is made to schedule the fourth burst of the uplink PDTCH block in block period 1.

At the start of block period 2 of FIG. 6C, the mobile again attempts to schedule new blocks. Similar to block period 1, when a BCCH burst D in block period 2 conflicts with a downlink PDTCH burst E (which is a later portion of PDTCH data burst block 1) and an uplink PDTCH burst F, the BCCH burst D is prioritized over the others and is received and decoded by the mobile device. As shown, the mobile device still also receives and decodes an initial portion of PDTCH data burst block 1 by reducing the number of slots that need to be received. For the uplink PDTCH burst F, the entire uplink item interferes and the remainder of the uplink block is canceled. No attempt is made to schedule the remaining bursts of the uplink PDTCH block in block period 2. As apparent, the disturbance associated with the high priority BCCH reception only lasts for two block periods, and as soon as the BCCH block of four BCCH data bursts is received, packet transfer mode continues in full operation (e.g. see block period 3).

Figure 6D:
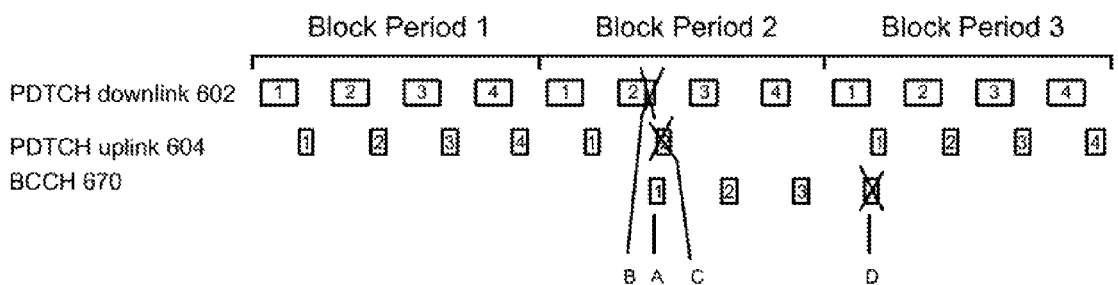

Interference is often not as disruptive as described in relation to FIG. 6C, which may be considered a fairly disruptive scenario to illustrate some less-than-optimal scenarios. FIG. 6D shows another scenario where the timing of the BCCH block over a BCCH 670 to be received is less disruptive of communications. In FIG. 6D, when a BCCH burst A in block period 2 conflicts with a downlink PDTCH burst B (which is a later portion of PDTCH data burst block 2) and an uplink PDTCH burst C, the BCCH burst A is prioritized over the others and is received and decoded by the mobile device. As shown, the mobile device still also receives and decodes an initial portion of PDTCH data burst block 2 by reducing the number of slots that need to be received. For the uplink PDTCH burst C, the entire uplink item interferes and the remainder of the uplink block 2 is canceled. If reception is good, however, the mobile device may successfully decode the BCCH block without receiving all four BCCH bursts, and thereby not require the reception of the fourth and final BCCH burst of the BCCH block D. In this scenario, only the blocks in block period 2 were affected, whereas the blocks in block period 3 were completely unaffected.

According to the present disclosure, operations of the PDTCH are partially discontinued only just enough to monitor the BCCH of the neighbor cell if it is a high priority or imminent handoff candidate. Potentials collisions or conflicts between the PDTCH and the BCCH are identified by the mobile device at the microsecond level, so that if the timeslots for the PDTCH and neighbour cell BCCH do not conflict, both may proceed normally.

Comparing the present techniques with prior art techniques, an efficient and less disruptive communication scheme is provided for packet data sessions. Using prior art techniques, a mobile device operates to completely suspend packet data transfer operations over the PDTCH so that it may receive information over a broadcast control channel (BCCH) or packet BCCH (PBCCH) for a handoff candidate neighbor cell. A selective retransmit scheme of the packet data session is subsequently utilized to receive data blocks missed during the suspension. Although all appropriate information is eventually received using this prior art technique, it may be very disruptive and wasteful with respect to data throughput, as data may be transmitted by the wireless network that is never received by the mobile device. Under some circumstances, it may even cause the wireless network to cancel the packet data session due to the lack of response from the mobile device.

According to the present disclosure, a mobile communication device is adapted to receive and decode packet data of a plurality of packet data bursts of a data block over a packet data channel during a packet data session. The mobile communication device is further adapted to receive and decode broadcast control data of a plurality of broadcast data bursts of the same or adjacent data block over a broadcast control channel contemporaneously with the receiving and decoding of the packet data, where each broadcast data burst is interleaved with packet data bursts of the packet data session. When a time conflict between at least one of the packet data bursts and at least one of the broadcast data bursts exists, the mobile communication device is adapted to prioritize the receiving and decoding of the at least one packet data burst over the at least one broadcast data burst. However, if the at least one broadcast data burst is from a "prioritized" or "imminent" handoff candidate neighbor cell, the mobile communication device is adapted to prioritize the receiving and decoding of the at least one broadcast data burst over the at least one packet data burst. Advantageously, an efficient and less disruptive communication technique is provided during packet data sessions.

The above-described embodiments of the present disclosure are intended to be examples only. For example, although the present disclosure describes a technique applicable to a GSM/GPRS network, the technique is also applicable to other, networks such as a CDMA or other suitable network. Those of skill in the art may effect alterations, modifications and variations to the particular embodiments without departing from the scope of the application. The invention described herein in the recited claims intends to cover and embrace all suitable changes in technology.

What is claimed is:

1. A method for use in a mobile device having a radio frequency (RF) receiver for wireless communications, the method comprising:
   when a packet data burst being communicated to the mobile device over a packet data channel of a serving cell and a broadcast data burst being communicated to the mobile device over a broadcast control channel of a neighbor cell are identified by the mobile device to be overlapped in time:
   setting the RF receiver of the mobile device to receive the packet data burst instead of the broadcast data burst based on identifying that the neighbor cell is not a candidate for an upcoming handoff; and
   setting the RF receiver of the mobile device to receive the broadcast data burst instead of the packet data burst based on identifying that the neighbor cell is a candidate for an upcoming handoff and that a call drop between the mobile device and the serving cell is imminent; and
   identifying that the call drop is imminent when a signal strength measurement of the serving cell is identified to be below a predetermined threshold.

2. The method of claim 1, further comprising:
   receiving and decoding, at the mobile device, a plurality of packet data bursts aver a packet data channel of the serving cell; and
   while receiving and decoding the packet data bursts over the packet data channel of the serving cell, receiving and decoding, at the mobile device, a plurality of broadcast data bursts over the broadcast control channel of a neighbor cell.

3. The method of claim 1, wherein the packet data channel comprises a packet data traffic channel (PITCH) and the broadcast control channel comprises a broadcast control channel (BCCH).

4. The method of claim 1, wherein the broadcast control channel is defined by a first frequency and time slot combination and the packet data channel is defined by a second frequency and time slot combination.

5. A mobile communication device, comprising:
   a radio frequency (RF) transceiver;
   a controller coupled to the RF transceiver;
   the controller being configured to:
   when a packet data burst being communicated to the mobile device over a packet data channel of a serving cell and a broadcast data burst being communicated to the mobile device over a broadcast control channel of a neighbor cell are identified by the mobile device to be overlapped in time:
   set the RF receiver of the mobile device to receive the packet data burst instead of the broadcast data burst based on identifying that the neighbor cell is not a candidate for an upcoming handoff;
   set the RF receiver of the mobile device to receive the broadcast data burst instead of the packet data burst based on identifying that the neighbor cell is a candidate for an upcoming handoff and that a call drop between the mobile device and the serving cell is imminent;
   identify that the call drop is imminent when a signal strength measurement of the serving cell is identified to be below a predetermined threshold.

6. The mobile communication device of claim 5, wherein the controller is further configured to:
   receive and decode a plurality of packet data bursts over a packet data channel of the serving cell; and
   while receiving and decoding the packet data bursts over the packet data channel of the serving cell, receive and decode a plurality of broadcast data bursts over the broadcast control channel of a neighbor cell.

7. The mobile communication device of claim 5, wherein the packet data channel comprises a packet data traffic channel (PDTCH) and the broadcast control channel comprises a broadcast control channel (BCCH).

8. The mobile communication device of claim 5, wherein the broadcast control channel is defined by a first frequency and time slot combination and the packet data channel is defined by a second frequency and time slot combination.

9. A computer program product, comprising;
   a non-transitory computer readable medium;
   computer instructions stored in the non-transitory computer readable medium;
   the computer instructions being executable by one or more processors of a mobile communication device having a radio frequency (RF) receiver; for:
   when a packet data burst being communicated to the mobile device over a packet data channel of a serving cell and a broadcast data burst being communicated to the mobile device over a broadcast control channel of a neighbor cell are identified by the mobile device to be overlapped in time:

causing an RF a radio frequency (RF) receiver of the mobile device to receive the packet data burst instead of the broadcast data burst based on identifying that the neighbor cell is not a candidate for an upcoming handoff; and causing the RF receiver of the mobile device to receive the broadcast data burst instead of the packet data burst based on identifying that the neighbor cell is a candidate for an upcoming handoff and that a call drop between the mobile device and the serving cell is imminent;

identifying that the call drop is imminent when a signal strength measurement of the serving cell is identified to be below a predetermined threshold.

10. The computer program product of claim 9, wherein the computer instructions are further executable for:

receiving and decoding, at the mobile device, a plurality of packet data bursts over a packet data channel of the serving cell; and while receiving and decoding the packet data bursts over the packet data channel of the serving cell, receiving and decoding, at the mobile device, a plurality of broadcast data bursts over the broadcast control channel of a neighbor cell.

11. The computer program product of claim 9, wherein the packet data channel comprises a packet data traffic channel (PDTCH) and the broadcast control channel comprises a broadcast control channel (BCCH).

12. The computer program product of claim 9, wherein the broadcast control channel is defined by a first frequency and time slot combination and the packet data channel is defined by a second frequency and time slot combination.

* * * * *